(12) United States Patent
Davis

(10) Patent No.: US 8,631,722 B1
(45) Date of Patent: Jan. 21, 2014

(54) MULTI-FUNCTIONAL BARTENDER'S TOOL AND RELATED METHODS

(76) Inventor: James C. Davis, Normandy Park, WA (US)

( * ) Notice: Subject to any disclaimer, the term of this patent is extended or adjusted under 35 U.S.C. 154(b) by 130 days.

(21) Appl. No.: 12/372,718

(22) Filed: Feb. 17, 2009

Related U.S. Application Data

(60) Provisional application No. 61/029,262, filed on Feb. 15, 2008.

(51) Int. Cl.
*B67B 7/44* (2006.01)
*B25F 1/00* (2006.01)

(52) U.S. Cl.
USPC ................................... 81/3.09; 7/155

(58) Field of Classification Search
USPC ........... 81/3.09, 3.47, 3.56, 3.36, 3.35; 7/110, 7/113, 154, 155; D7/665–668
See application file for complete search history.

(56) References Cited

U.S. PATENT DOCUMENTS

| | | | | |
|---|---|---|---|---|
| 155,579 A * | 10/1874 | Hagerty | | 7/110 |
| 260,258 A * | 6/1882 | Trickel | | 7/110 |
| 1,446,114 A * | 2/1923 | Boyd | | 7/113 |
| 2,777,195 A * | 1/1957 | Dalianis | | 7/113 |
| 2,886,994 A * | 5/1959 | Hanson | | 81/3.35 |
| 4,437,359 A * | 3/1984 | Dejoux et al. | | 81/3.09 |
| 4,531,457 A * | 7/1985 | Sivaslian | | D7/666 |
| 6,732,392 B2 | 5/2004 | Kay | | |
| 7,024,715 B2 | 4/2006 | Hefti et al. | | |
| 7,055,200 B2 * | 6/2006 | Lion et al. | | 7/113 |
| 7,059,741 B2 | 6/2006 | Elsener | | |
| 7,146,667 B2 | 12/2006 | Elsener | | |
| 7,337,486 B2 | 3/2008 | Tsuda et al. | | |
| 7,373,681 B2 | 5/2008 | Elsener | | |
| 7,698,767 B2 * | 4/2010 | Clark, Jr. | | 81/3.09 |

* cited by examiner

*Primary Examiner* — Hadi Shakeri

(57) ABSTRACT

Apparatus and methods are disclosed for a combination tool useful for bartending or the like. The tools combined for efficiency, convenience, and other purposes include one or more zesters, bottle openers, corkscrews, juicers, jiggers or measuring cups, knives, pouring spout, and/or others. In one embodiment, the combined tools are in a shape that is safe to the user, a size that is relatively portable and lightweight, and from materials that are non-contaminating and readily cleaned. Methods include using the tool for bartending or similar activities.

11 Claims, 17 Drawing Sheets

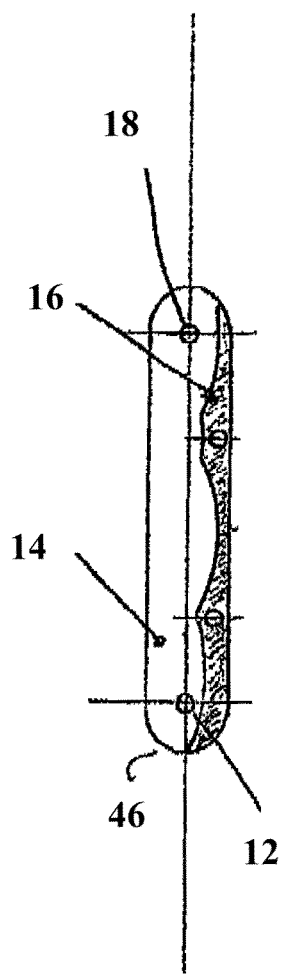 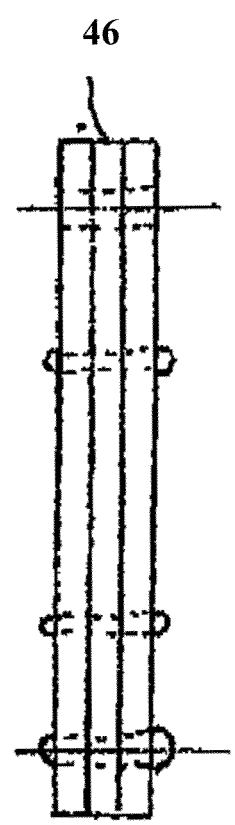
*Fig. 10*          *Fig. 11*

US 8,631,722 B1

MULTI-FUNCTIONAL BARTENDER'S TOOL AND RELATED METHODS

CROSS-REFERENCE TO RELATED APPLICATION

This application claims priority to U.S. Provisional Application Ser. No. 61/029,262, filed Feb. 15, 2008, the contents of which are incorporated herein by reference in their entirety.

FIELD OF THE INVENTION

The present invention relates generally to apparatus and methods involving a combination tool for tasks associated with bartending or similar activities.

SUMMARY OF THE INVENTION

In performing the tasks associated with bartending or similar activities, a number of different tools exist to assist the bartender. Such tools typically include bottle openers, corkscrews, zester, juicer, jigger or measuring cup, and several types of knives, to name just a few. Although certain limited combinations of a few of these tools exist, and although certain "multi-tools" exist (such as Swiss Army® knives and Leatherman® multi-tools), those existing items are very limited (such as combination bottle openers and corkscrews for opening both bottle-cap style bottles and bottles provided with corks) and/or do not include some of the specialty tools useful for bartending or similar activities. Therefore, it is one object of the present invention to provide a plurality of tools useful in bartending or similar activities within a single device.

Another of the many objects and advantages of the invention is the provision within a single device of the combination (and/or sub-combinations) of a serrated knife, a non-serrated knife, a dual zester (such as with 4 small holes and 1 large hole), a bottle opener, a cork screw and lever for using same, a juicer, and a single shot measuring cup or similar measures. The particular selection of the tools to be combined can take a wide variety of forms and combinations, all providing convenience, affordability, and other benefits.

Yet another of the many objects and advantages of the invention is the provision within a single apparatus of a device of the aforementioned character from primarily or completely aluminum, stainless steel, and/or some similarly durable and useful material(s).

A further object and advantage of the invention is the provision of a tool for bartending, cooking, and/or similar activity, that is space-saving, versatile, convenient, and less expensive than buying multiple separate tools.

Still another object and advantage of the invention is the provision within a single device of the combination of a variety of tools that are both fixed and movable. It is desirable that such movable tools may rotate, slide, fold, and/or similar movement from a closed or retracted position to an open or extended position about a hinge or similar apparatus.

Even still another object and advantage of the invention is the provision within a single device a plurality of tools provided within a handle of the device Still yet another of the many objects and advantages of the invention is the provision of a method of providing bartending services using a tool of the aforementioned character.

For the purpose of summarizing the invention certain objects and advantages have been described herein. It is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIGS. 10 and 11 are side and top views of a retracting device for retractable coupling of the cork screw, the knife, and the zester to the handle in the tool of FIG. 1;

DETAILED DESCRIPTION

Figure 1:
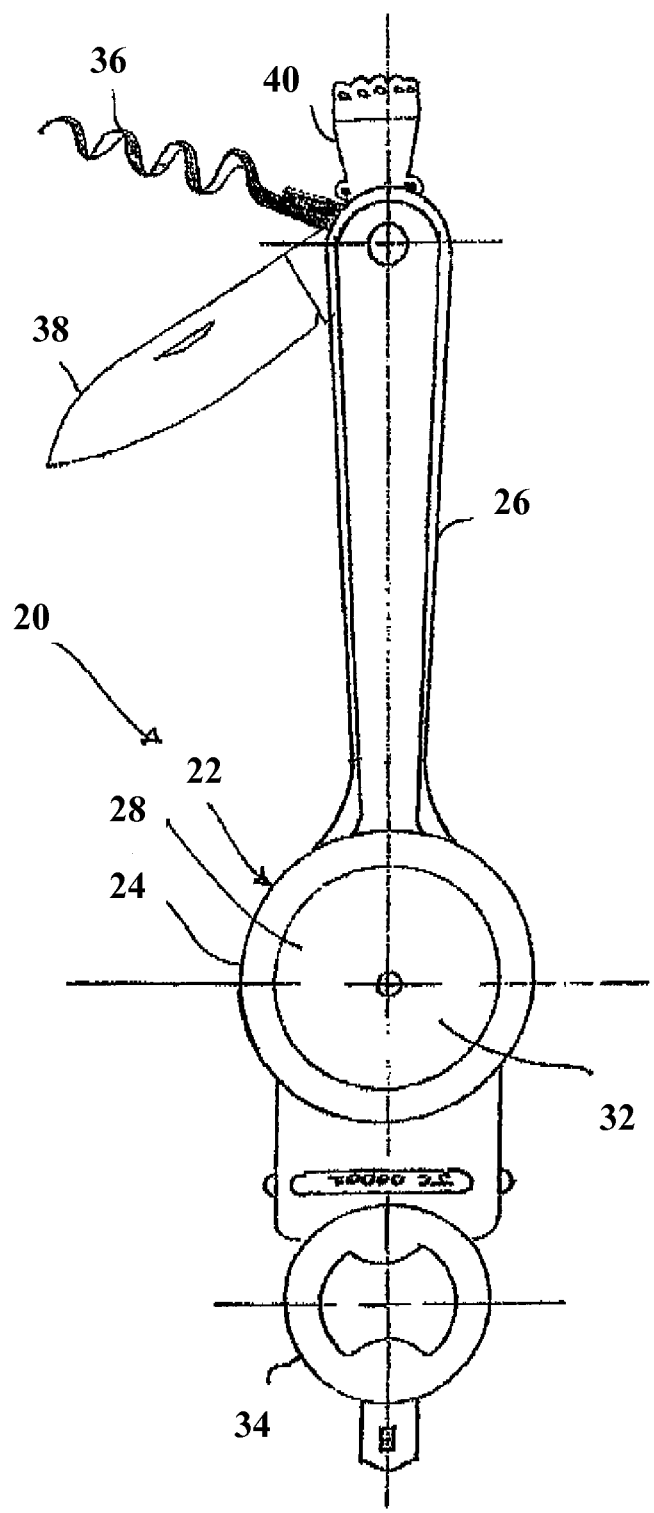
FIG. 1 is a top view of a multi-functional bartender's tool in accordance with one embodiment of the present invention, wherein the cork screw, the knife, and the zester are shown in an extended orientation.

Embodiments of the present invention will now be described with references to the accompanying Figures, wherein like reference numerals refer to like elements throughout. The terminology used in the description presented herein is not intended to be interpreted in any limited or restrictive manner, simply because it is being utilized in conjunction with a detailed description of certain embodiments of the invention. Furthermore, various embodiments of the invention (whether or not specifically described herein) may include novel features, no single one of which is solely responsible for its desirable attributes or which is essential to practicing the invention herein described.

In a preferred embodiment of the present invention, a combination tool is provided which includes a measuring element, such as a shot cup or similar measuring device, a juicing element, at least one knife, a cork screw, a lever, and at least one zesting element.

In an alternative embodiment of the present invention, the combination tool can also include a second zesting element, an additional knife or knives, a knife locking mechanism, a spout or pouring element, and a bottle opener. Persons of ordinary skill in the art will understand that the aforementioned elements may be provided in any combination (or sub-combination) and that fewer or greater of the elements described may be provided, while still enjoying the benefits of the present invention.

Figure 22:
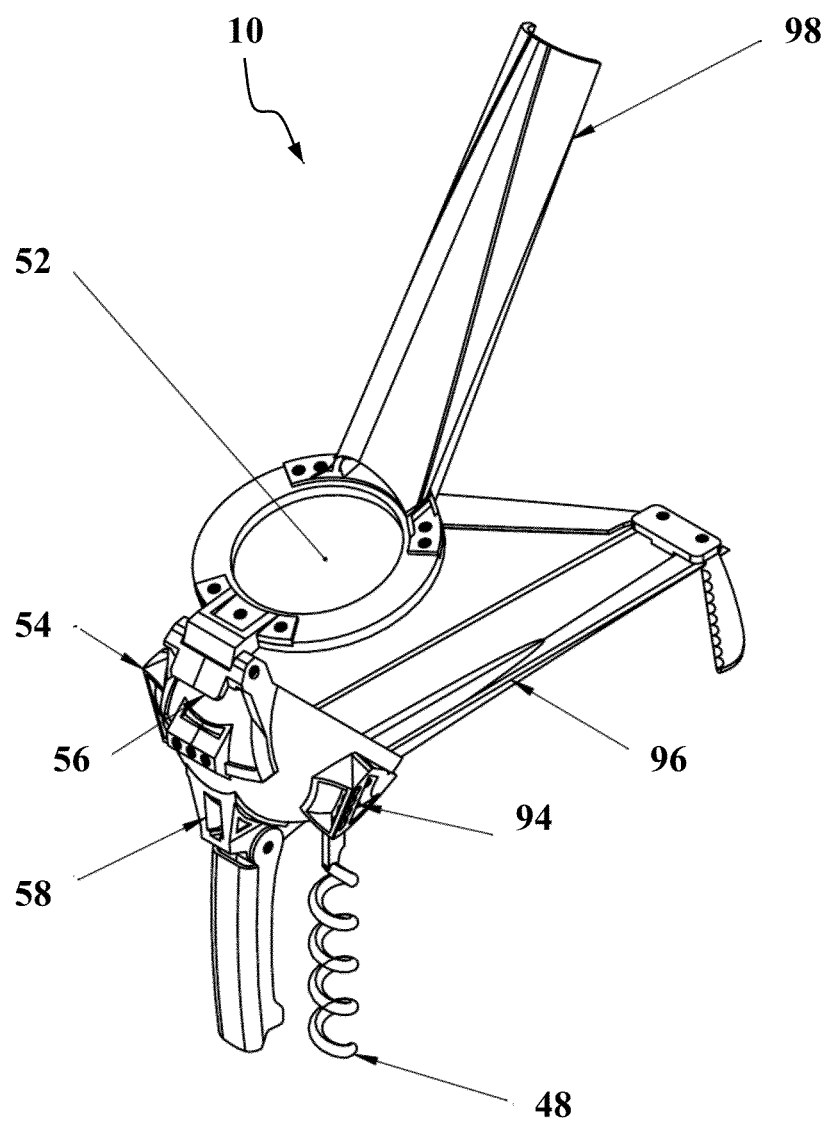
FIG. 22 is a side elevational view of the multi-functional bartender's tool of FIG. 14 in an extended configuration.
Figure 23:
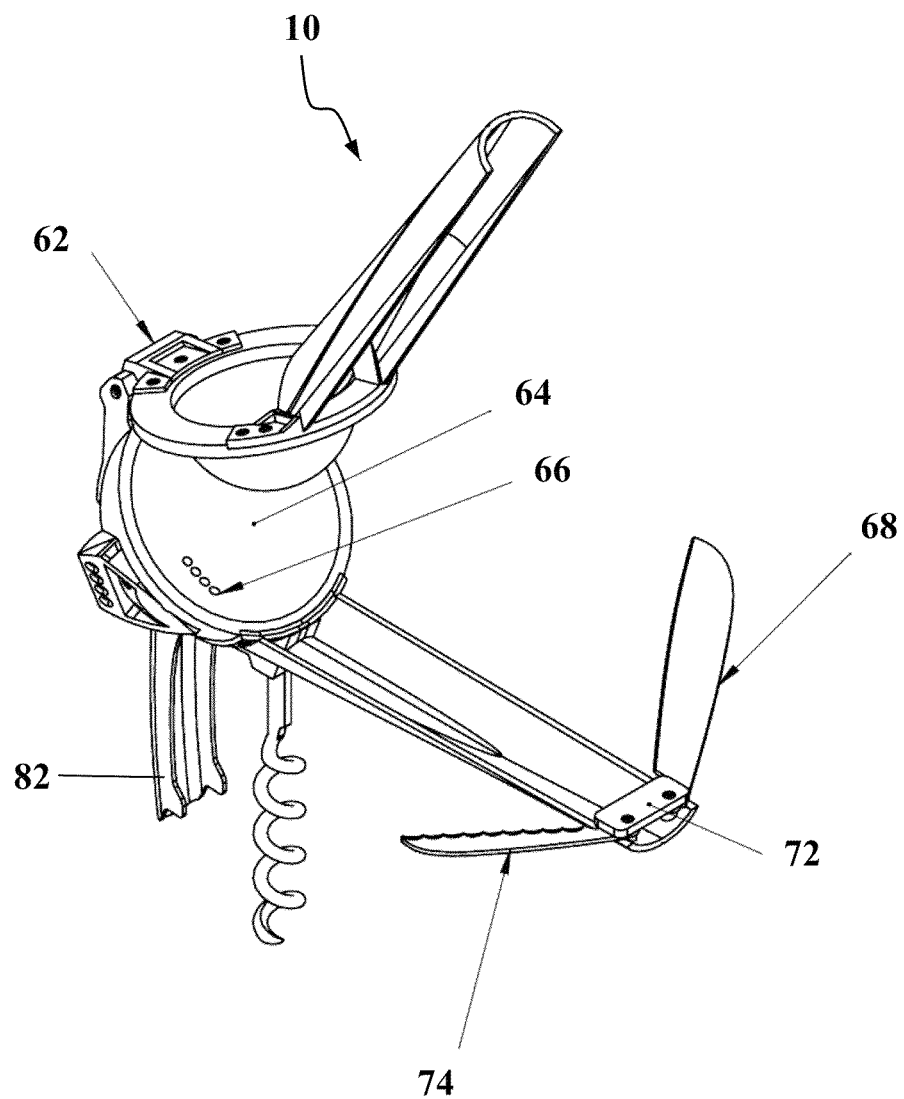
FIG. 23 is a top elevational view of the multi-functional bartender's tool of FIG. 14 in an extended configuration.
Figure 24:
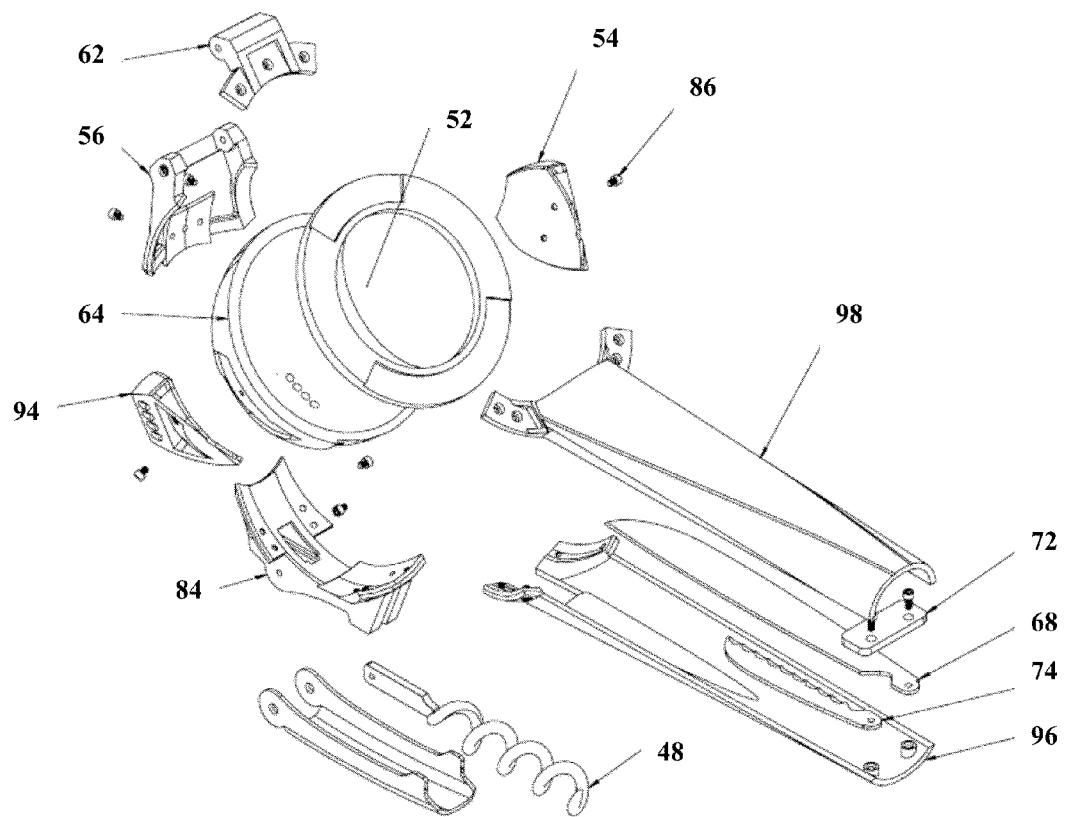
FIG. 24 shows an exploded view of the multi-functional bartender's tool of FIG. 14.

As illustrated in FIGS. 22 and 23, the invention preferably includes a top handle 98 and a bottom handle 96. The top handle 98 is preferably connected to a measuring/shot cup or 52 or similar type element at one end and the bottom handle 96 is preferably connected to a juicing element 64 or similar type element at one end. The measuring cup 52 and the juicing element 64 are hingedly connected to each other by a hinge 62. Preferably, the measuring cup 52 and the juicing element 64 are both "bowl-shaped" (similar to a half sphere), but persons of ordinary skill in the art will appreciated that they may be provided in any size, shape and/or configuration in order to provide the benefits realized by the present invention.

Preferably, the measuring cup 52 serves dual functions. First, the interior portion of the measuring cup 52 is capable of measuring things such as liquid to be poured into a drink. The measuring cup may be provided in different sizes in order to measure differing amounts, depending on the intended use of the device. In addition, the bottom exterior portion of the measuring cup serves as a press for applying pressure to an item to be squeezed in the juicing element. In this regard, the measuring cup 52 preferably fits into or seats within the juicing element 64 in a desired relationship such that the bottom of the measuring cup 52 acts as a press capable of pressing or squeezing fruit or other thing to be pressed/squeezed which is placed in the interior portion of the juicing element. A user may preferably grip the top handle and the bottom handle in one hand, and squeeze the handles together in order to press the measuring cup and the juicing element together. The hinge 62 connecting the measuring cup and the juicing element allows the handles to be squeezed together. When an item such as fruit is provided in the interior portion of the juicer, the fruit is squeezed between the bottom portion of the measuring cup and the interior portion of the juicer, thus causing juice to be extracted from the fruit.

In a preferred embodiment of the present invention, the handles are used to press or squeeze the measuring cup 52 and the juicing element together. The handles are also useful for a user of the device to hold the tool steady when pouring liquid into the measuring cup or for holding the tool in a user's hand while performing any of the tasks discussed herein and using any of the tools provided on the device.

Preferably, the juicing element 64 is provided with openings or holes 66 which allow fruit juice or any other extracted/squeezed liquid to drain out of the juicing element into another apparatus such as a cup or similar device. The juicing element may also be provided with a juicing spout element 58 which connects to the openings or holes so that the liquid which drains from the openings is poured out of spout element. The juicing spout element allows a user to easily pour the extracted/squeezed liquid without excessive spilling or mess since the spout controls the flow of the liquid from the juicing element of the tool.

Figure 16:
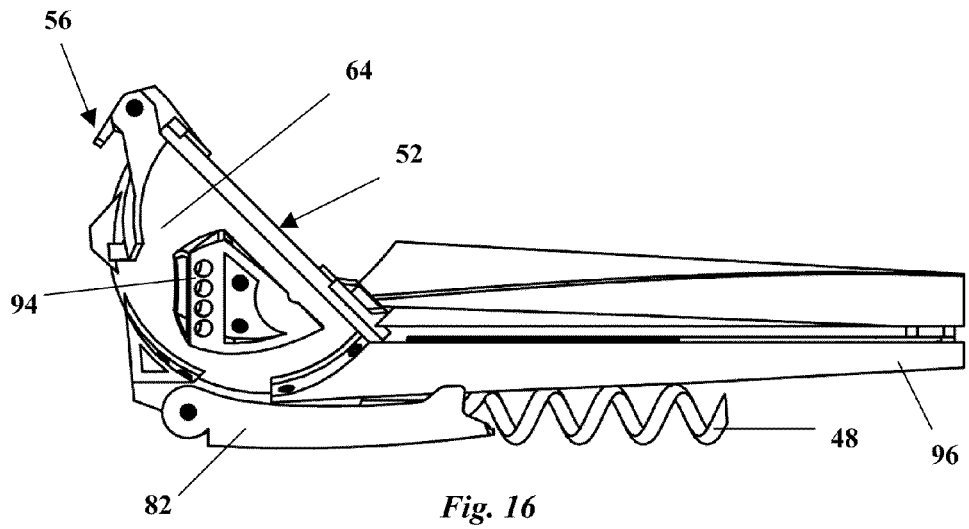
FIGS. 16 and 17 are side and bottom views of the multi-functional bartender's tool of FIG. 14.

The present invention also preferably includes a cork screw or extractor 48 which is hingedly connected to the bottom exterior portion of the juicing element, at the location where the bottom handle is connected to the juicing element. The cork screw may preferably be in a retracted/closed orientation (FIG. 16) or alternatively in an extended/open orientation (FIG. 23). When extended or open, the cork screw preferably extends downward and generally perpendicular to the bottom handle of the tool. When retracted or closed, the cork screw preferably is positioned along and generally parallel to bottom handle of the tool.

The cork screw is preferably used for opening bottles which are closed or sealed with a cork device in the neck of the bottle. In order to open such a bottle, the cork screw is first opened or extended so that the cork screw is generally perpendicular to the bottom handle of the tool. A user then grasps the bottom handle of the tool and the juicer element, places the tip of the cork screw into the cork of the bottle, and twists the tool while applying a downward pressure to the tool. This causes the cork screw to be twisted into the cork. In order to remove the cork from the bottle, a lever 82 is also provided on the tool. A user places the lever on the edge of the bottle neck, pulls the bottom handle upward, which causes the cork screw to pull the cork out of the neck of the bottle. The cork may then be removed from the cork screw by twisting the cork in the opposite direction around the cork screw until the tip of the cork screw is withdrawn from the cork.

Figure 17:
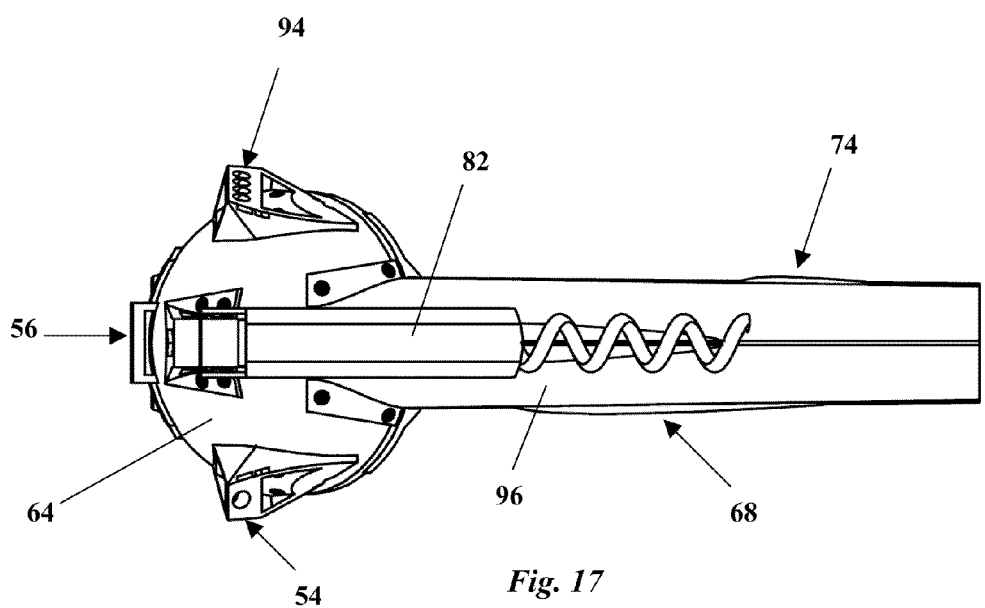
Figure 18:
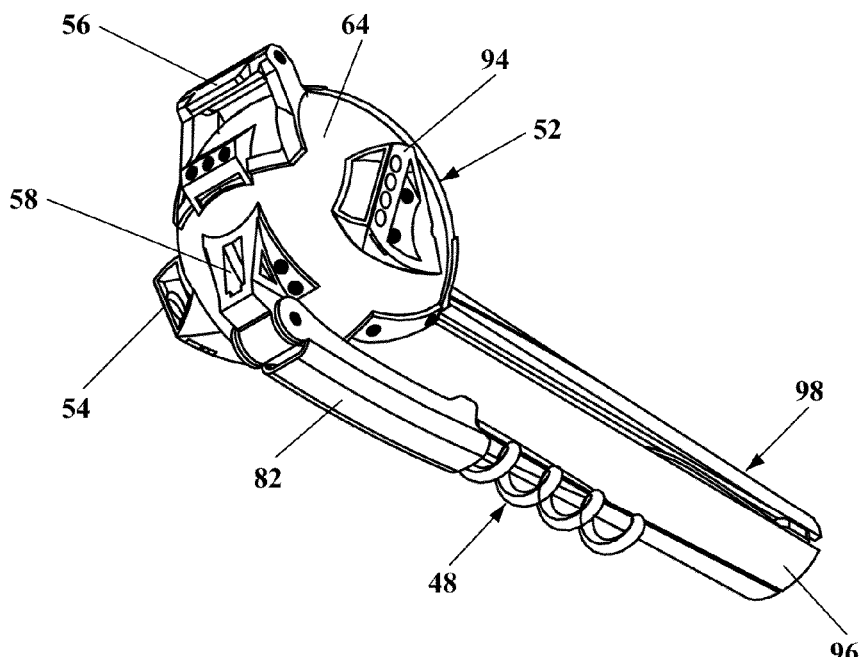
FIG. 18 is a bottom elevational view of the multi-functional bartender's tool of FIG. 14.

Preferably, the lever 82 is provided on the bottom exterior portion of the juicing element such that when the lever is in a closed or retracted orientation (FIG. 17), the lever is placed over a portion of the cork screw. When the lever is in an extended or opened orientation (FIG. 22), it is preferably generally parallel to the opened or extended cork screw orientation.

In a preferred embodiment of the present invention, a bottle opener 56 is provided on the hinge 62 which connects the measuring cup and the juicing element. The bottle opener 56 is used for opening bottle cap style bottles. Persons of ordinary skill will understand that the bottle opener may be provided on any portion of the tool while still providing the benefits of the invention.

The present invention is preferably provided with one or more zesting elements such as element 94. The zesting element is preferably attached to an exterior side portion of the juicing element. The zester may be provided with one or more holes or openings in order to scrape or grate the skin of a fruit or like item. One or more additional zesting elements 54 may be provided at any convenient location, such as on the opposite exterior side portion of the juicing element. Persons of ordinary skill will understand that the number of zesting elements provided or the number of openings in those zesting elements may vary depending on the intended use of the tool. It may be desirable, for example, to have a zesting element with four holes and another zesting element with only one hole. In addition persons of ordinary skill will appreciate that the zesting element(s) may be provided on any portion of the tool, such as the top handle or bottom handle, while still enjoying the many benefits provided for by the invention.

Figure 19:
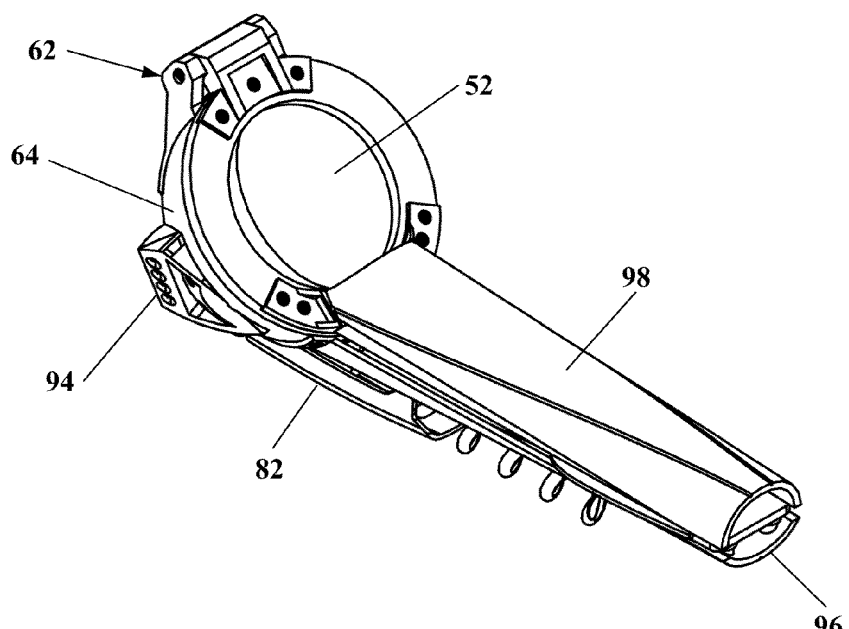
FIG. 19 is a top elevational view of the multi-functional bartender's tool of FIG. 14.
Figure 20:
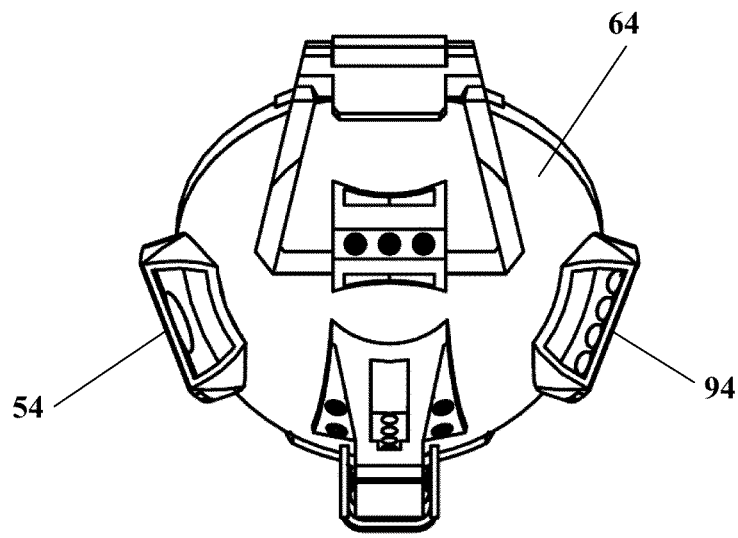
FIG. 20 is a front view of the multi-functional bartender's tool of FIG. 14.
Figure 21:
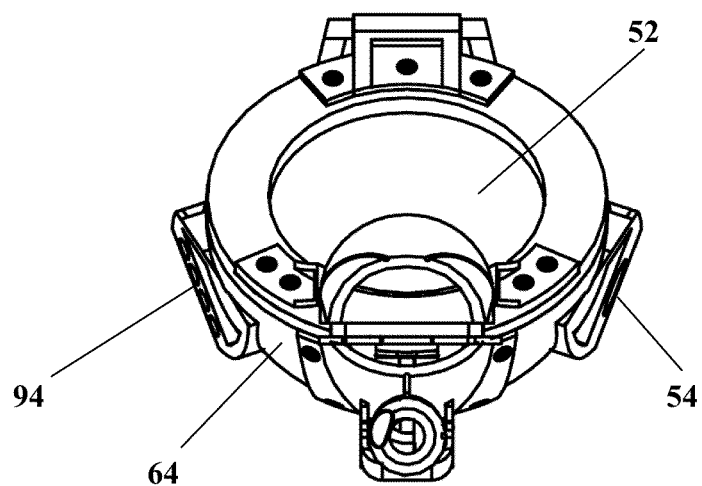
FIG. 21 is a section view of the multi-functional bartender's tool of FIG. 14.

In a preferred embodiment of the present invention the bottom handle forms a housing which houses a serrated knife 74 and a non-serrated knife 68. Preferably, the knives are pivotably attached to one end of the bottom handle such that they can be moved from a closed or retracted orientation (FIG. 19) to an opened or extended orientation (FIG. 23). In addition, the tool preferably includes a knife locking mechanism 72 which temporarily holds the knives in their closed or retracted orientation until a user pulls them out from the bottom handle housing into their opened or extended orientation. Persons of ordinary skill in the art will appreciate that fewer or additional knives may be provided and that the type of knife provided may vary depending on the desired need. In addition, persons of ordinary skill will appreciate that the knife(s) may alternatively be provided on the top handle, or any other suitable location on the tool.

Figure 25:
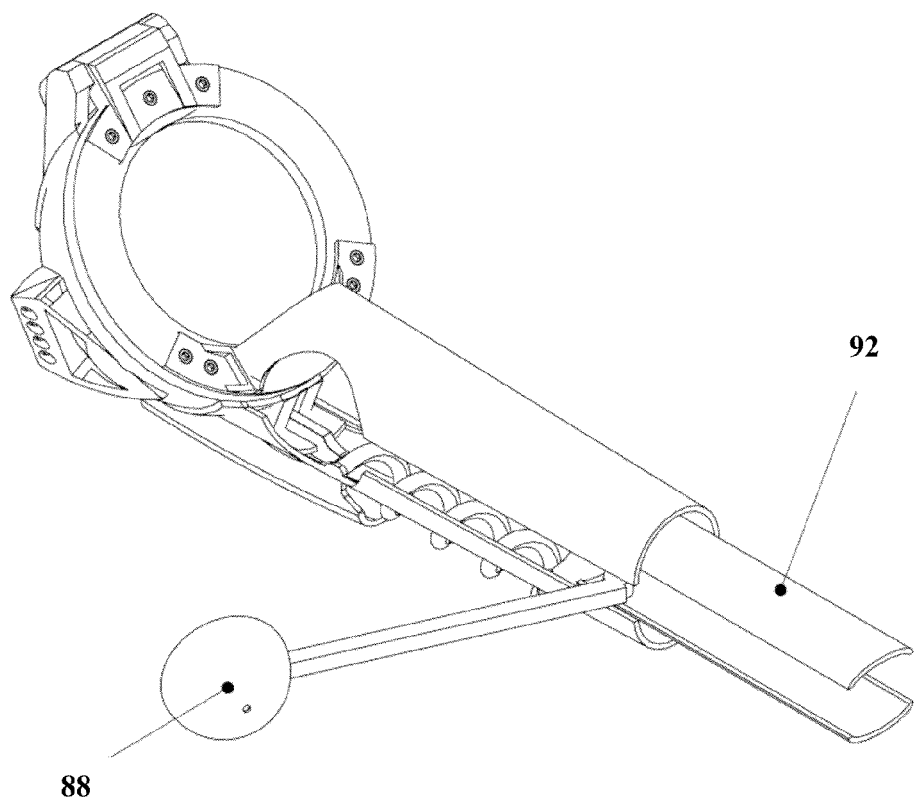
FIG. 25 is a top elevational view of a multi-functional bartender's tool in accordance with still yet another embodiment of the present invention.
Figure 26A:
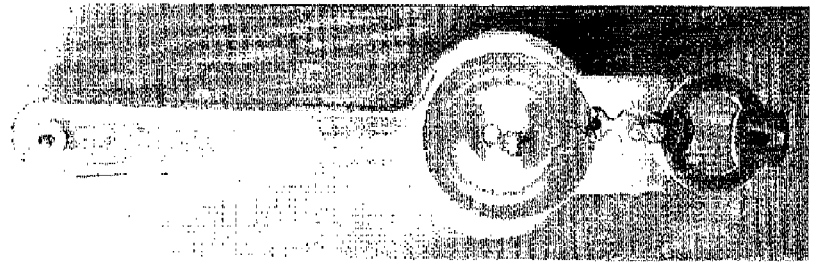
FIGS. 26a-f show additional photographs of a multi-functional bartender's tool in accordance with one embodiment of the present disclosure.
Figure 26B:
Figure 26C:
Figure 26D:
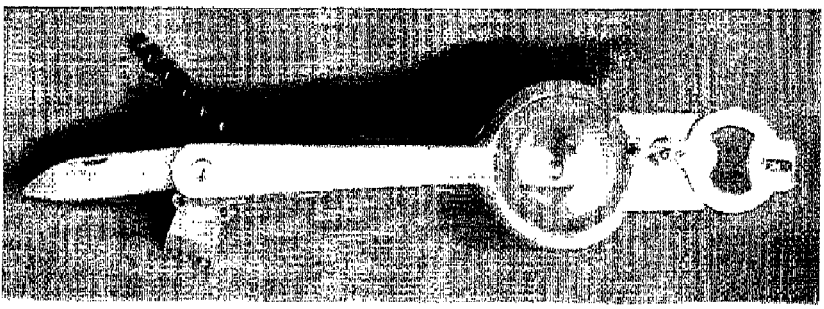
Figure 26E:
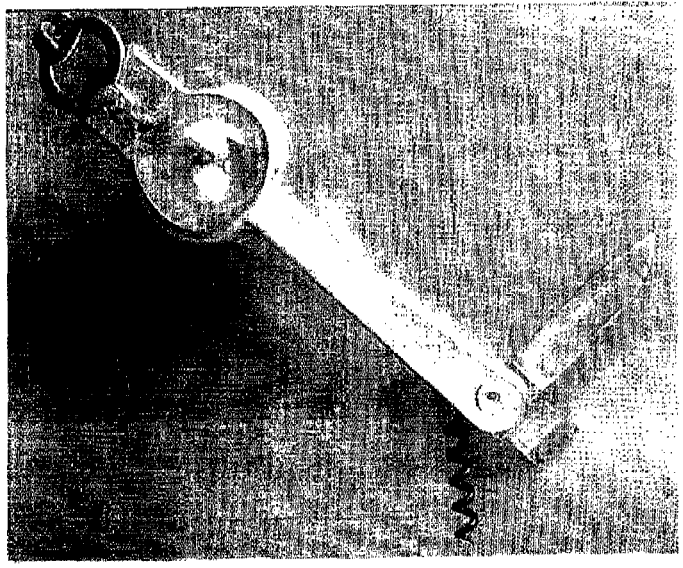
Figure 26F:
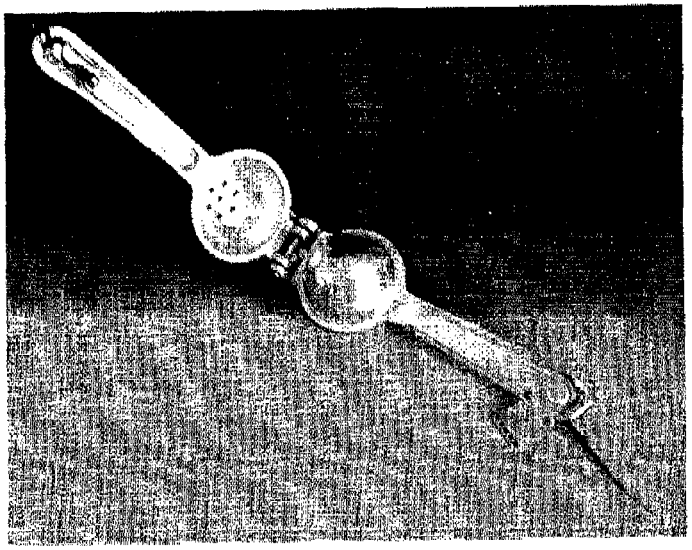

In an alternative embodiment of the present invention, the tool may be provided with many other types of elements other than those described above. For example, as shown in FIG. 25, the tool may be provided with a melon baller 88 or other similar type element. Persons of ordinary skill in the art will appreciate that the possible elements which can be included on the combination tool are endless, and they are not limited to those disclosed herein.

In addition, as shown in FIG. 25, the tool may include extendable handles 92 whose length is adjustable depending on the needs of the user and the size of the user's hand. Persons of ordinary skill in the art will appreciate that any other elements included on the tool may be made to be extendable/adjustable in size or length, and still be within the scope of the present invention.

The invention preferably provides some form of all-in-one bar/cooking/etc. tool. Preferably, within a single device users will have the benefits of multiple functions, such as a combination and/or sub-combination(s) of one or more knives (the knives being of the same and/or varying types, such as serrated, regular blade, etc.); one or more zesters (with varying features such as one or more small/large/combination of holes), one or more bottle openers (for different types and sizes of bottles), one or more cork screws (with associated levers or other elements to provide desirable leverage), one or more measuring elements (such as for 1 shot), and the ability to squeeze fruit or other things.

The tool 10 preferably is fabricated from a relatively stable, non-contaminating, easily cleanable material or materials, including by way of example aluminum and stainless steel, plastics, or the like. Many embodiments of the tool preferably provide space saving and convenience in various activities (such as cooking, drink-making or the like), and can be cheaper to buy than purchasing the tools separately.

In an alternative embodiment of the invention, as shown in FIGS. 1-11, the tool 20 includes a lime squeezer 22 having a squeezing portion 24 and a handle 26, wherein the squeezing portion 24 includes a press 28 and a strainer 30 hingedly connected to one another, the press 28 including a cup 32 configured for use as a measuring cup or shot cup.

Figure 2:
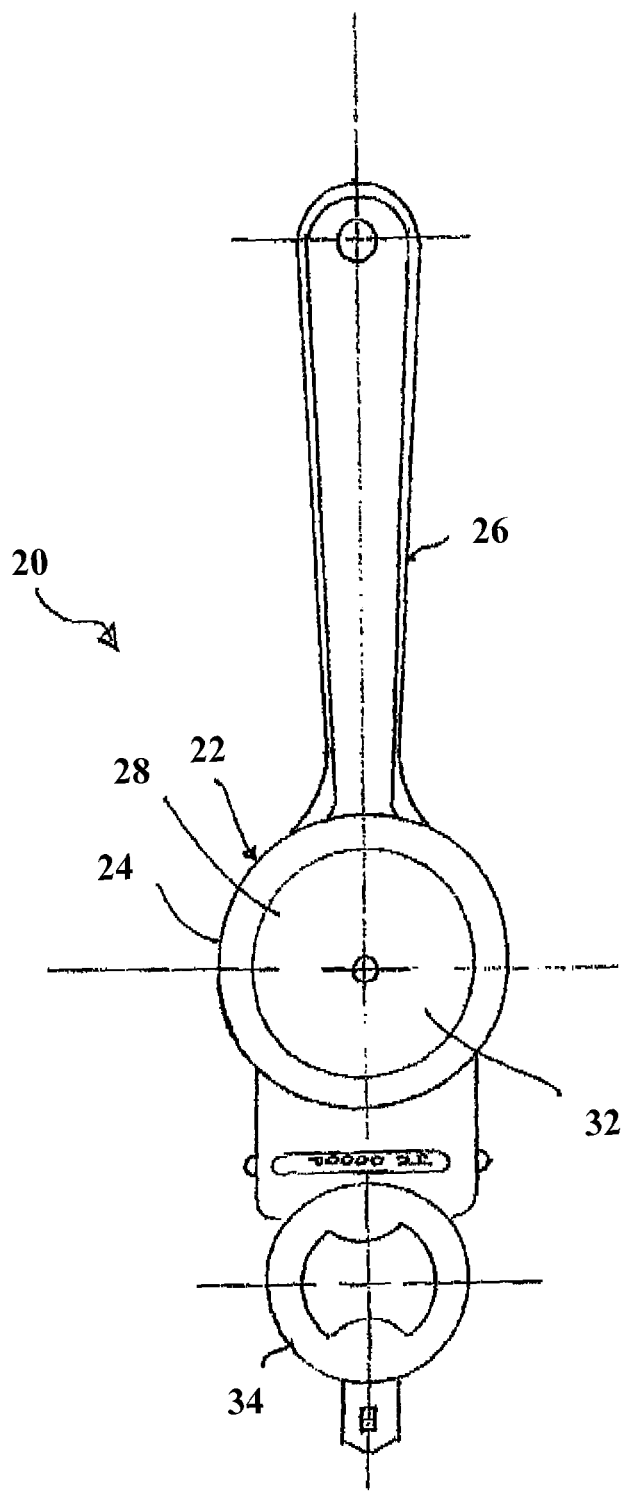
FIG. 2 is a top view of the tool of FIG. 1, wherein the cork screw, the knife, and the zester are shown in a retracted orientation.
Figure 3:
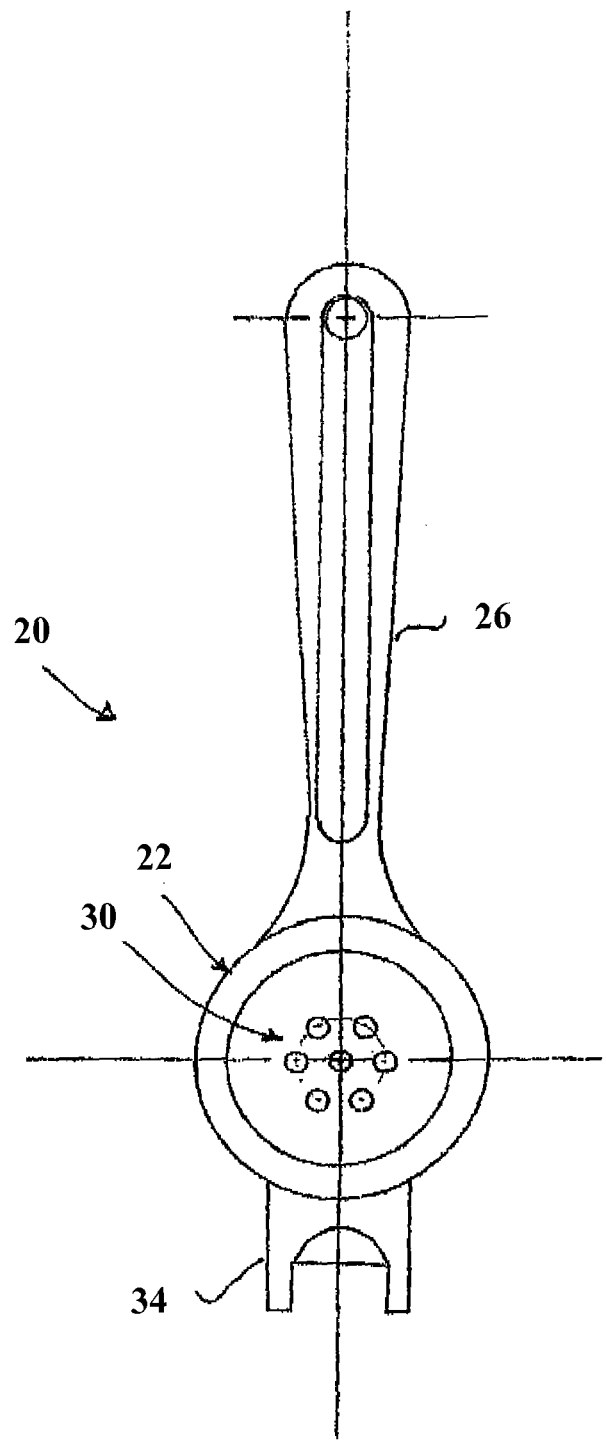
FIG. 3 is a bottom view of the tool of FIG. 1, wherein the cork screw, the knife, and the zester are shown in a retracted orientation.
Figure 4:
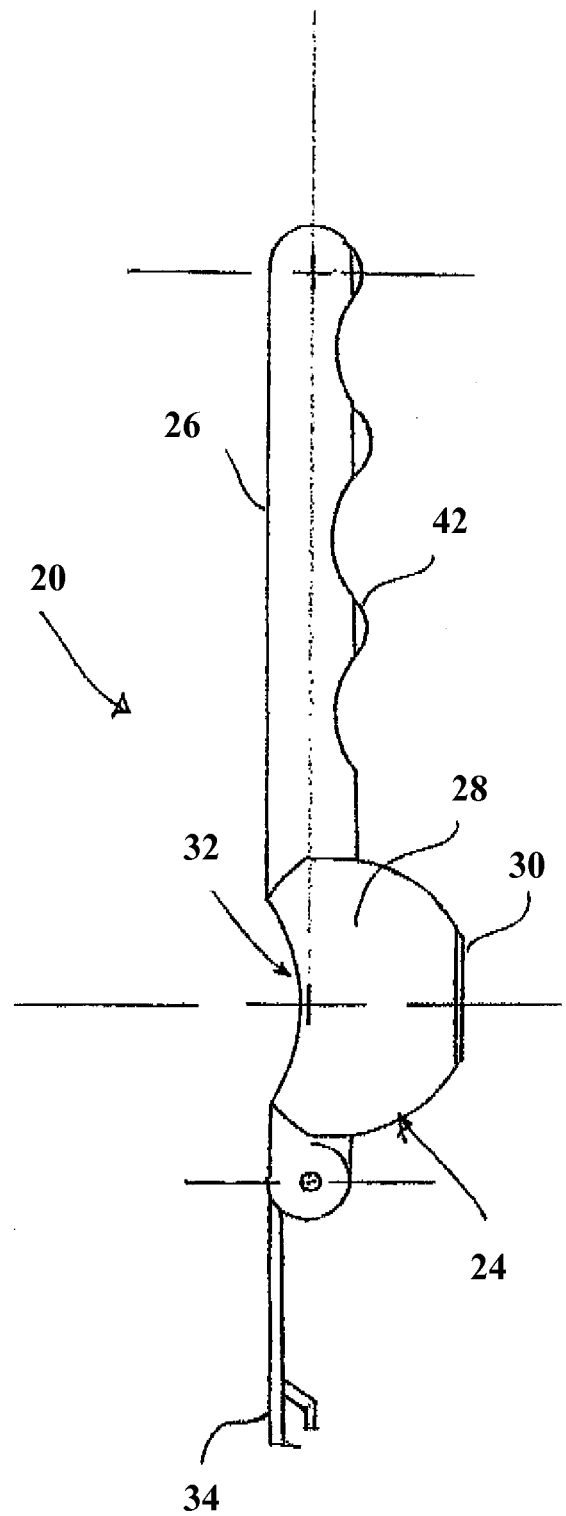
FIG. 4 is a bottom view of the tool of FIG. 1, wherein the cork screw, the knife, and the zester are shown in a retracted orientation and further showing a hand grip for the handle of the tool.
Figure 5:
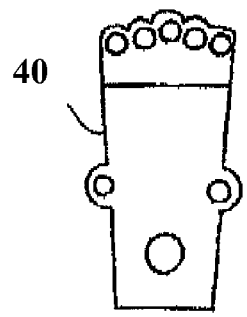
FIG. 5 is a top view of the zester of the tool of FIG. 1, wherein the zester is decoupled from the tool.
Figure 6:
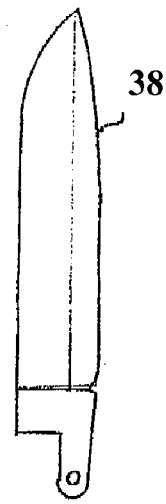
FIG. 6 is a top view of the knife of the tool of FIG. 1, wherein the knife is decoupled from the tool.
Figure 7:
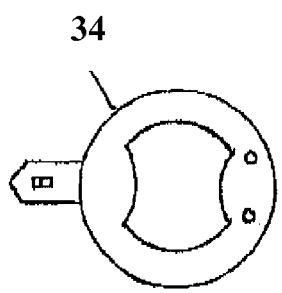
FIG. 7 is a top view of the bottle opener of the tool of FIG. 1, wherein the bottle opener is decoupled from the tool.
Figure 8:
FIG. 8 is a top view of the cork screw of the tool of FIG. 1, wherein the cork screw is decoupled from the tool.
Figure 9:
FIG. 9 is a top view of a pin of the tool of FIG. 1, wherein the pin is decoupled from the tool.
Figures 12, 13:
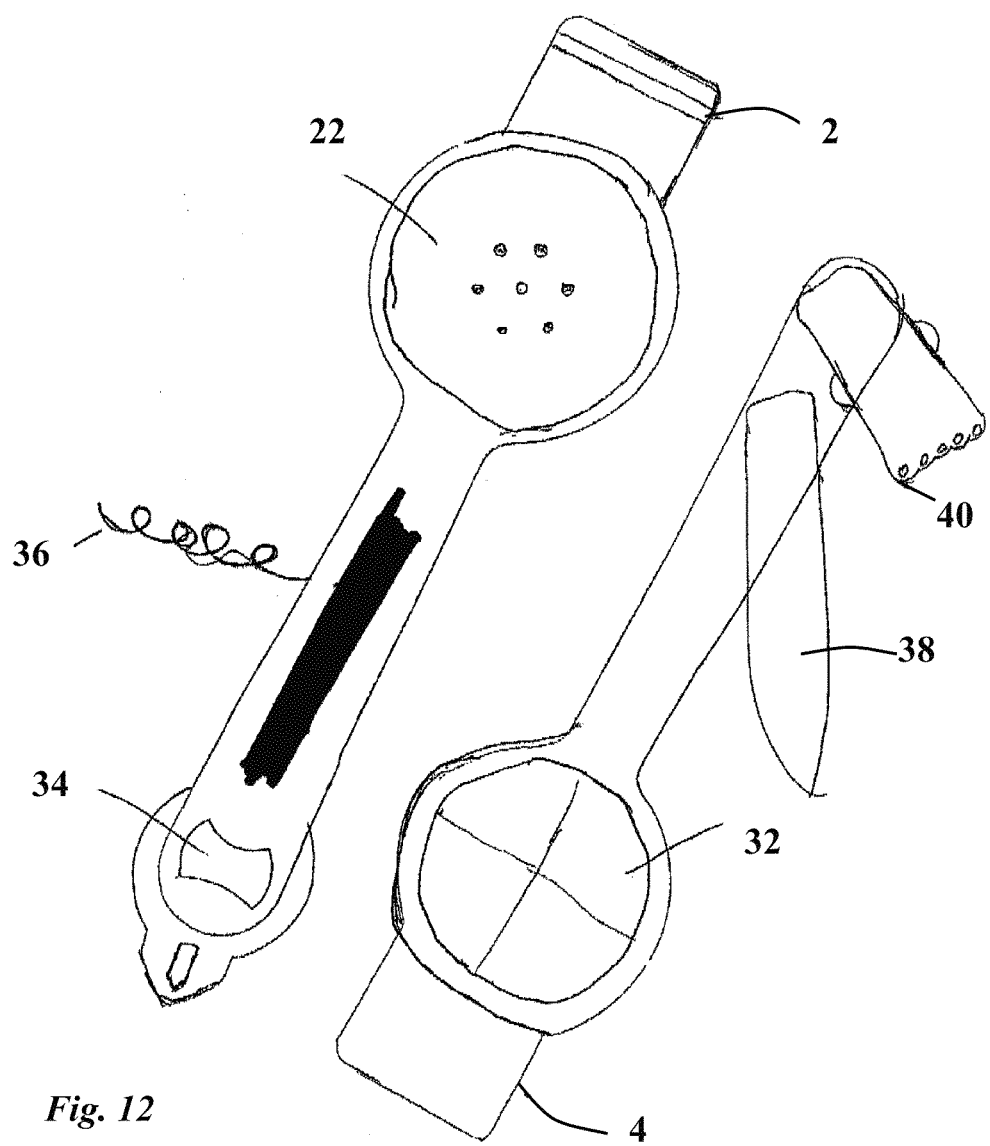
FIGS. 12 and 13 are top and bottom views of a multi-functional bartender's tool in accordance with another embodiment of the present invention.
Figure 14:
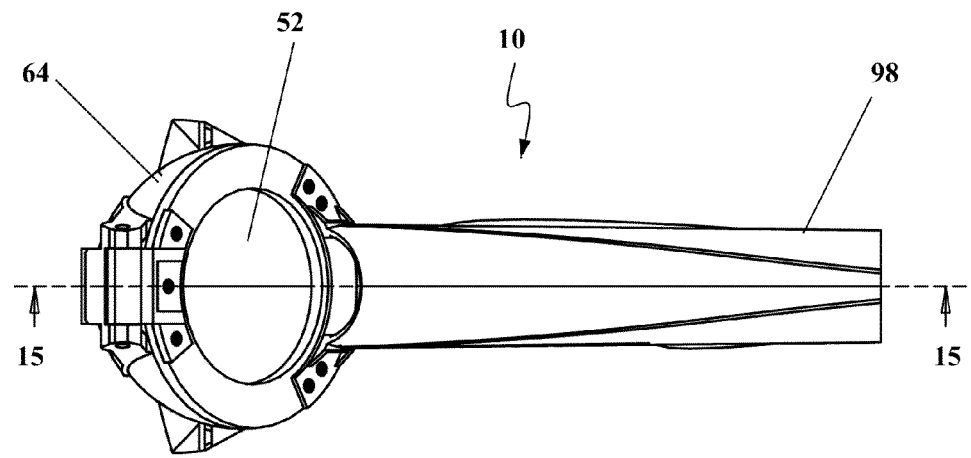
FIG. 14 is a top view of a multi-functional bartender's tool in accordance with yet another embodiment of the present invention.
Figure 15:
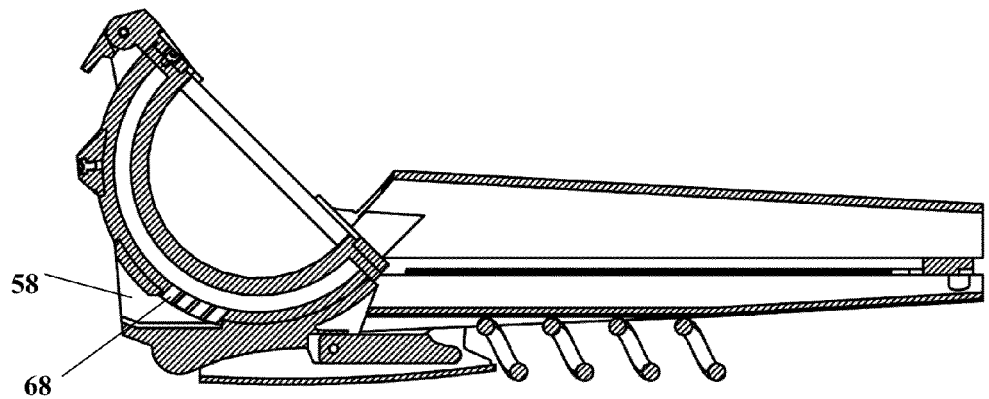
FIG. 15 is a section view of the multi-functional bartender's tool of FIG. 14, taken along line 15-15.

The tool 20 further includes a bottle opener 34, a cork screw 36, a knife 38, and a zester 40, all coupled to the tool 20, wherein the cork screw 36, the knife 38, and the zester 40 are hingedly or retractably coupled to the handle 26 and are shown in an extended orientation in FIG. 1. The cork screw 36, the knife 38, and the zester 40 may alternatively be retracted, as shown in FIGS. 2 and 3. The handle 26 of the tool 20 may further include a hand grip 42.

FIGS. 5-9 show the zester 40 (FIG. 5), the knife 38 (FIG. 6), the bottle opener 34 (FIG. 7), the cork screw 36 (FIG. 8), and the pin 44 (FIG. 9) components decoupled from the tool 20.

FIGS. 10 and 11 show a retracting device 46 for retractable coupling of the cork screw 36, the knife 38, and the zester 40 to the handle 26 in the tool 20.

Although the methods of the invention are described herein with steps occurring in a certain order, the specific order of the steps, or any continuation or interruption between steps, is not necessarily intended to be required for any given method of practicing the invention.

The apparatus and methods of the present invention have been described with some particularity, but the specific designs, constructions, and steps disclosed are not to be taken as delimiting of the invention. Modifications and further alternatives will make themselves apparent to those of ordinary skill in the art, all of which will not depart from the essence of the invention and all such changes and modifications are intended to be encompassed within the appended claims.

What is claimed is:

1. A combination tool comprising:
a first handle including a first end and second end and a second handle including a front end and a back end, said first end of said first handle connected to a measuring element and said front end of said second handle connected to a juicing element, said juicing element sized and configured to receive a bottom portion of said measuring element, wherein said measuring element and said juicing element are hingedly connected and wherein the first handle and the second handle are pressed together by a user so that the bottom portion of the measuring element is received within the juicing element;
a cork screw element hingedly connected to an exterior bottom portion of the juicing element at the front end of the second handle, wherein said cork screw is positioned along a bottom portion of the second handle when in a retracted or closed orientation;
a lever element hingedly connected to a second exterior bottom portion of the juicing element, wherein said lever portion is configured to be placed over said cork screw element when the lever portion and the cork screw element are in a retracted or closed orientation;
at least one zesting element attached to an exterior side portion of said juicing element; and
wherein the second handle comprises a housing portion, said housing portion including at least one knife pivotably attached to the back end of the second handle.

2. The tool of claim 1, wherein said housing portion of said second handle includes at least two knives pivotably attached to the back end of the second handle.

3. The tool of claim 2, wherein at least one of said at least two knives is a serrated knife.

4. The tool of claim 1, further including a locking mechanism at the back end of said second handle for temporarily retaining said at least one knife within the housing portion of the second handle.

5. The tool of claim 1, wherein said juicing element includes at least one opening for draining liquid.

6. The tool of claim 1, further including a second zesting element attached to a second exterior side portion of the juicing element.

7. The tool of claim 1, wherein said at least one zesting element includes at least one opening for grating the surface of an object such as fruit.

8. The tool of claim 7, wherein said at least one zesting element includes at least four openings for grating the surface of an object such as fruit.

9. The tool of claim 1, further including a spout element attached to the second exterior bottom portion of the juicing element and the lever element.

10. The tool of claim 9, wherein the spout element connects to an opening in said juicing element so that liquid can drain from the juicing element to the spout element.

11. The tool of claim 1, further including a bottle opener element attached to a hinge element at a hinged connection between the measuring element and the juicing element.

* * * * *